US006565690B1

United States Patent
Cerezo Pancorbo et al.

(10) Patent No.: US 6,565,690 B1
(45) Date of Patent: May 20, 2003

(54) PROCESS FOR MANUFACTURING STRUCTURES OF COMPOSITE MATERIAL

(75) Inventors: Carlos Cerezo Pancorbo, Madrid (ES); Rafael Dominguez Casado, Madrid (ES); Manuel De Castro Nodal, Madrid (ES); Augusto Perez Pastor, Madrid (ES); Aquilino Garcia Garcia, Madrid (ES); Manuel Huertas Garcia, Madrid (ES)

(73) Assignee: Construcciones Aeronauticas, S.A., Madrid (ES)

( * ) Notice: Subject to any disclaimer, the term of this patent is extended or adjusted under 35 U.S.C. 154(b) by 180 days.

(21) Appl. No.: 09/625,878

(22) Filed: Jul. 26, 2000

(30) Foreign Application Priority Data

Mar. 7, 2000 (ES) .......................... P200000550

(51) Int. Cl.⁷ ............................... B32B 31/04
(52) U.S. Cl. .................. 156/196; 156/245; 156/285; 264/241; 264/257; 264/258; 249/163; 249/165; 425/412
(58) Field of Search ................. 156/196, 199, 156/200–202, 221, 285, 245; 264/241, 257, 258, 285, 294, 299; 249/160, 163, 165, 177, 184; 425/411, 412

(56) References Cited

U.S. PATENT DOCUMENTS

| 5,286,438 A | 2/1994 | Dublinski et al. | |
| 5,292,475 A | * 3/1994 | Mead et al. | 264/257 |
| 5,817,269 A | 10/1998 | Younie et al. | |
| 5,902,535 A | * 5/1999 | Burgess et al. | 264/257 |
| 6,217,000 B1 | * 4/2001 | Younie et al. | 244/123 |
| 6,245,275 B1 | * 6/2001 | Holsinger | 249/127 |
| 6,391,246 B2 | * 5/2002 | Shiraishi et al. | 156/289 |

FOREIGN PATENT DOCUMENTS

DE 3418110 11/1985

OTHER PUBLICATIONS

Patent Abstract of Germany of DE 34 18 110 A1, dated Nov. 21, 1985.

* cited by examiner

Primary Examiner—Jeff H. Aftergut
Assistant Examiner—Jessica Rossi
(74) Attorney, Agent, or Firm—Ladas & Parry

(57) ABSTRACT

A process for manufacturing primary structures of composite material with curing in a female tool, comprising the steps of laminating superimposed composite material layers in a pre-impregnated state; placing the obtained laminate over a forming tool, loading the assembly of the laminate and forming tool in a vacuum bell and applying a pre-established forming operation, loading the formed laminate, still in a green state, in a female tool suitable for its curing, placing lateral caul plates in the tool and inserting elastomeric pipes in channels of the caul plates, fitting a central caul plate, sealing the assembly and applying a vacuum bag with perforations to remove the air from its interior. The assembly is cured in an autoclave.

16 Claims, 2 Drawing Sheets

PROCESS FOR MANUFACTURING STRUCTURES OF COMPOSITE MATERIAL

FIELD OF THE INVENTION

The present invention relates to a process for manufacturing primary structural elements with curing in a female tool to assist required dimensional tolerances of such components and the absence of porosity in the area of radii while preventing outward flow of resin. The manufactured structural components may have both transverse and longitudinal overthicknesses and reinforcements.

More specifically, the present invention intends to develop the necessary theoretical concepts and the related manufacturing processes, to carry out laminating, forming and curing of primary structures, such as front and rear aircraft spars, in a female tool with determined dimensional limitations.

The technology corresponding to curing in a female tool by caul plates is novel and has been totally developed by the applicant.

One of the most productive industrial applications of the invention is to manufacture large parts whose dimensional quality is assured.

BACKGROUND OF THE INVENTION

The technology of curing in a female tool by support on respective caul plates, totally developed by the present invention, is entirely new and for the first time allows an aircraft spar or other primary structure to be manufactured by a process to be described more fully later, including automatic taping, thermoforming and curing in a female tool. The invention is the result of the research carried out regarding flying-surfaces or so called LFS (Large Flying-Surfaces) and in FB 4.1 preliminary certification tests (torsion box with fuel pressure).

From the results of the previous experiments as well as from related manufacturability studies and tests, it is found that the application of the process of the invention is feasible and reliable for its use in manufacturing high resistant structures with strict quality requirements.

FIELD OF APPLICATION OF THE INVENTION

This invention is applicable to the manufacture of formed composite material parts.

These parts may include:
Aircraft structures and controls such as flying-surface coatings, spars, ribs, fixtures
Space vehicles.
Marine and land vehicles.
Industrial Machinery and equipment.
The manufacturing processes involved to obtain these parts are:
Laminating composite material (manual or automatic).
Cutting composite material.
Hot forming composite material.
Handling and positioning stiffeners, parts and tools.
Autoclave curing.

The materials used in the manufacture of these parts may be integrated by different resins and different fiber types, such as:
Fiberglass.
Carbon fiber.
KEVLAR fiber (aramid fiber)
Boron fiber.
Epoxy resin.
Thermoplastic resin.
Other heat-stable resins.

SUMMARY OF THE INVENTION

The object of the invention is a process for manufacturing structural parts of composite material in which the curing of the parts occurs inside a female tool. This is obtained by means of suitable tooling permitting control and prevention of resin flow during cycle.

The cured part may be a wing spar, a stabilizer, both horizontal and vertical, or any carbon fiber component with a U-shaped transverse section.

The essence of the process of the present invention is to design a female tool permitting a complete compaction of the radii without significant porosity and with a high dimensional accuracy. For this purpose, relevant caul plates are used to attain the aforementioned object.

The purpose of the invention is applicable to the parts obtained by any lamination process (manual, automatic) but the novelty introduced by the invention is that it permits the manufacture of spars with automatic taping and hot forming, which avoids an expensive manual process for fitting fabrics, especially if in a tape form.

BRIEF DESCRIPTION OF THE DRAWINGS

For a better understanding of the process of the invention, the attached drawings will be resorted to, where.

DETAILED DESCRIPTION OF THE INVENTION

The manufacturing process developed by the invention to obtain structural parts of composite material involves a series of preliminary process steps to obtain an optimized curing.

Each one of them is described below:

A—Laminating of the Part or Parts

This consists in the superposition of composite material layers in a pre-impregnated condition, so that the orientation of the fiber is adapted to the structural requirements of the part. The distribution of the layers should permit their lamination and forming without distortion of the fiber and also that the part, once cured, has no permanent deformations due to thermal stresses. During lamination, necessary reinforcements to improve resistance of the part will also be introduced.

The laminated parts may be subjected to a later cutting according to the convenience of laminating several parts at the same time. In this case, fan laminating will be carried out.

B—Part Forming

Figure 1:
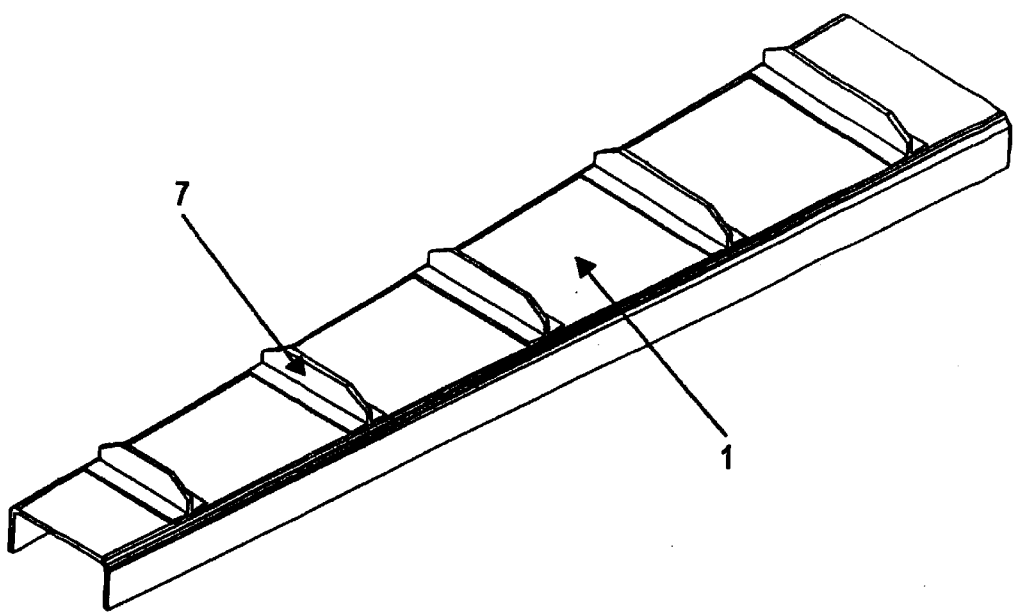
FIG. 1 is a general perspective view of a spar manufactured according to the process of the invention.

The part is placed and positioned, in this case a spar 1 (FIG. 1), on a forming tool 2 (FIG. 2) and pressed against the tool by corresponding caul plates (not shown)

Figure 2:
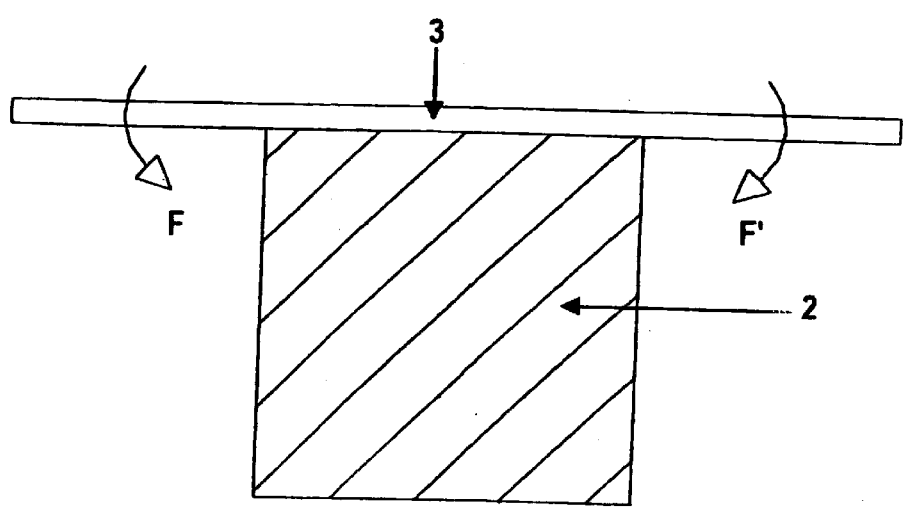
FIG. 2 illustrates the forming of the spar of FIG. 1

The assembly is loaded into a vacuum bell (not shown) and a predetermined forming cycle is carried out at a temperature between 55 and 65° C., to achieve the forming of the laminate 3 in the direction indicated by the arrows F, F' in FIG. 2.

C—Spar Curing

Figure 3:
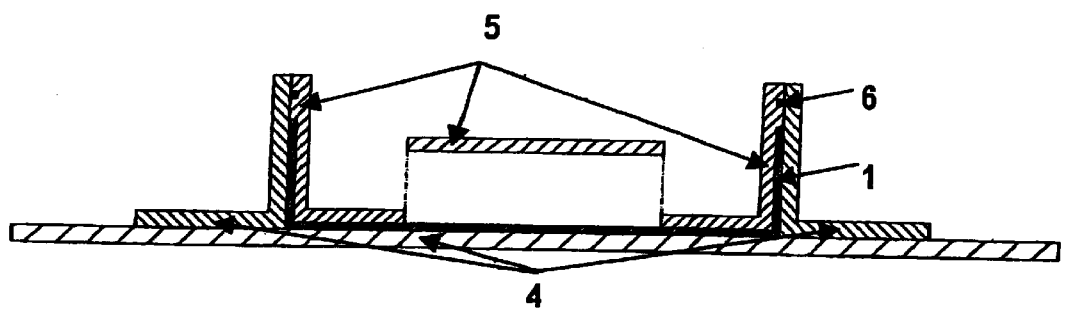
FIG. 3 shows the curing of the spar of FIGS. 1 and 2 in a female tool.

The now formed spar 1 is loaded, in a green state, in a female tool 4 for curing of the spar, and associated tools are fitted to prevent subsequently fitted caul plates 5 from marking the carbon fiber (FIG. 3).

Once the assembly is centered, the lateral caul plates 5 at the interior side are fitted and elastomeric pipes 6 are installed in channels in the caul plates 5. The assembly is closed and securing pins (not shown) are fitted.

The central caul plate 5 is placed and the assembly is sealed with strips at grooves between the lateral and central caul plates.

Finally, a vacuum bag (not shown) provided with suitable perforations to remove the air from its interior, is installed hence assuring perfect tightness thereof.

D—Autoclave Curling

The assembly of the female tool 4, spar 1, lateral and central caul plates, elastomeric pipes, pins, strips and vacuum bag is placed on a support plate of an autoclave. The autoclave is hermetically closed and a curing cycle is carried out under the following essential conditions:

Pressure: 5.95 to 10.5 kg/cm$^2$.

Temperature: up to 190° C. according to the material.

Heating/cooling speed: 0.5 to 2° C./min.

When the autoclave chamber reaches the environmental conditions of pressure and temperature again, the spar 1 with its now cured and perfectly consolidated material is removed.

E—Stiffeners

Transverse and longitudinal stiffeners 7 (FIG. 1) may be added to the cured spar 1. For this purpose, these stiffeners 7 are previously formed and cured, then bonded to the spar 1 with different types of structural adhesives. The possibility of adding co-bonded stiffeners 7 is also contemplated.

The aforementioned process of the invention is applicable to different spar 1 thicknesses of 2 to 20 mm and lengths of up to 17 m.

The essential features of the invention have been described above but it will be possible to modify certain details of the manufacturing process within the scope of the invention as defined by the attached claims.

What is claimed is:

1. A process for manufacturing a structural component of composite material comprising laminating layers of pre-impregnated material to form a laminate, placing the laminate on a forming tool, pressing the laminate against the forming tool, placing an assembly formed by the forming tool and the laminate in a vacuum to shape the laminate, loading the shaped laminate still in a green state into a female tool, placing lateral caul plates on insides of the laminate and placing elastomeric pipes in channels in the lateral caul plates, closing an assembly formed by the female tool, laminate, lateral caul plates and elastomeric pipes by fitting pins, fitting a central caul plate on the laminate, sealing an assembly formed by the female tool, laminate, lateral caul plates, elastomeric pipes, pins and central caul plate with strips between grooves of the central caul plate and lateral caul plates, placing the sealed assembly into a vacuum bag to subject the sealed assembly to a vacuum, loading an assembly formed by the female tool, laminate, lateral caul plates, elastomeric pipes, pins, central caul plate, strips and vacuum bag on a support tool of an autoclave and carrying out a curing cycle to cure the laminate and form the structural component.

2. The process of claim 1, wherein the laminate is shaped at a temperature between 55 and 65° C.

3. The process of claim 1, wherein the laminate is cured in the autoclave at a pressure of 5.95 to 10.5 Kg/m$^2$ and a temperature of up to 190° C. at a heating/cooling rate of 0.5 to 2° C./min.

4. The process of claim 1, wherein said structural component is applicable to aerospace, marine and land vehicles and controls thereof and to industrial machinery and equipment.

5. The process of claim 1, wherein said structural component is an aircraft wing spar, or a horizontal or vertical stabilizer.

6. The process of claim 1, wherein said structural component is formed with a U-shaped cross-section.

7. The process of claim 1, wherein said structural component has a thickness of 2 to 20 mm and a length of up to 17 mm.

8. The process of claim 1, wherein a plurality of structural components are laminated simultaneously by cutting the cured laminate into the structural component.

9. The process of claim 8, wherein the laminate is formed as a fan and the structural components are cut from the fan.

10. The process of claim 1, comprising joining previously formed and cured structural stiffeners to the formed and cured structural component.

11. The process of claim 10, wherein the stiffeners are joined to the structural component with structural adhesive.

12. The process of claim 10, wherein selected stiffeners are co-bonded to one another.

13. The process of claim 1, wherein said composite material comprises fibers and resin.

14. The process of claim 13, wherein said fibers are fiberglass, aramide fibers or boron fibers.

15. The process of claim 13, wherein said resin is a heat-stable resin.

16. The process of claim 15, wherein said resin is an epoxy resin or a thermoplastic resin.

* * * * *